United States Patent Office 2,753,733
Patented July 10, 1956

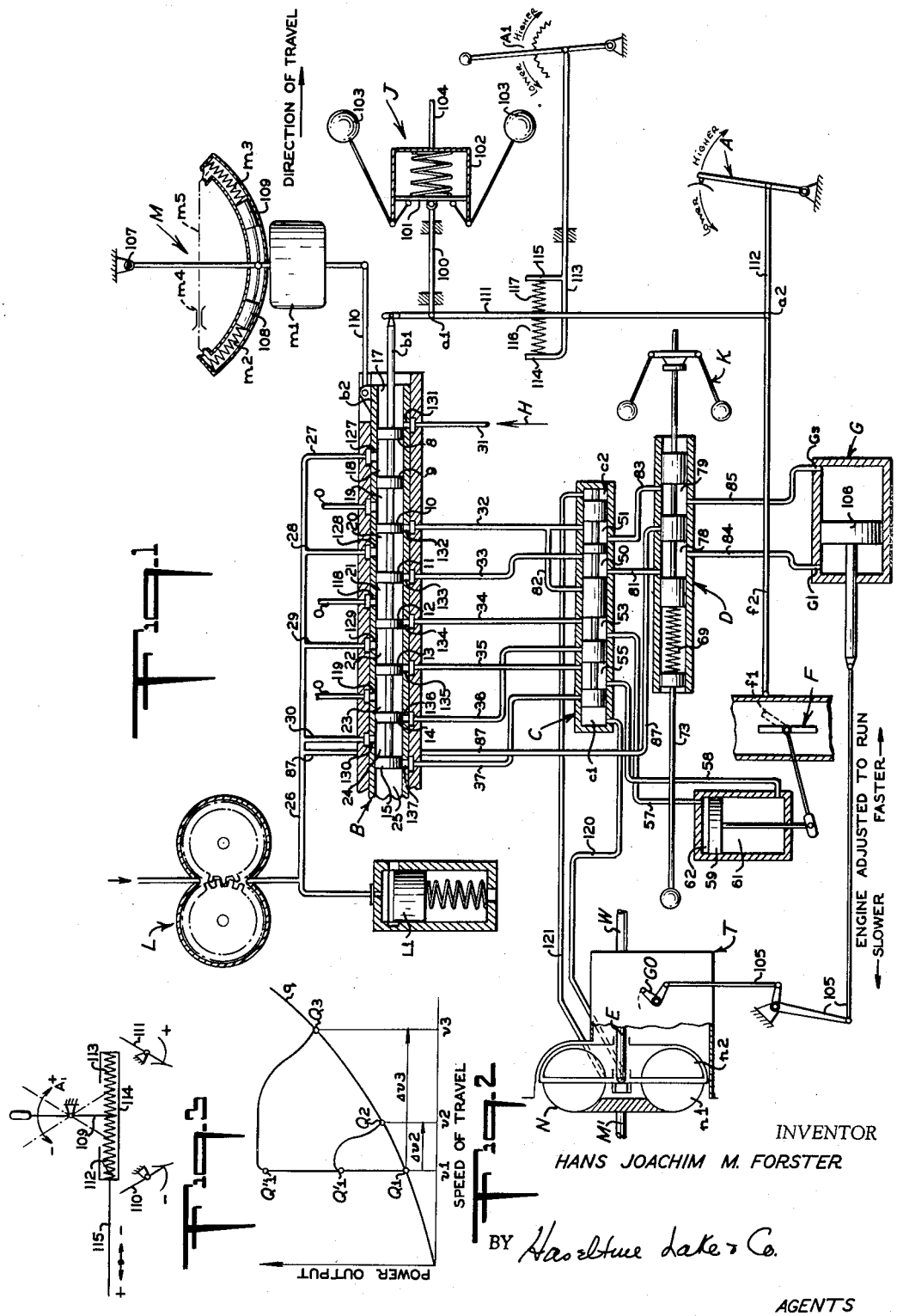

2,753,733

SYSTEM FOR CONTROLLING THE SPEED OF A MOTOR VEHICLE

Hans-Joachim M. Förster, Stuttgart-Bad Cannstadt, Germany, assignor to Daimler-Benz Aktiengesellschaft, Stuttgart-Unterturkheim, Germany Application September 29, 1953, Serial No. 383,035

Claims priority, application Germany October 2, 1952

5 Claims. (Cl. 74—472)

My invention relates to a system for controlling the speed of a motor vehicle and, more particularly, to a system in which an adjustable speed selector adapted to be optionally set by the driver to a position representative of the desired speed of the vehicle cooperates with suitable means to so control the engine, the transmission and the brakes as to automatically reduce to a minimum any difference that might exist between the desired speed and the true speed of the vehicle.

A system of this type forms the subject matter of my co-pending prior patent application Serial No. 192,718, filed on October 28, 1950, now Patent No. 2,707,405, dated May 3, 1955.

For the purposes of an easier understanding of the explanation following hereinafter, the difference between the selected speed and the actual speed will be called the "controlling factor" hereinafter.

The system includes a movable controlling element which is adapted to variably determine the driving force and the braking force applied to the wheels of the vehicle by controlling servomotors which govern the engine, the transmission and the brakes. This controlling element is automatically adjusted in dependence on the controlling factor from a neutral position to a positive or a negative operated position.

A controlling system of that nature is liable to be subject to undesirable oscillations due to the delayed restoration of the controlling element to its neutral position following any adjustment of the controlling element to an operated position in response to the controlling factor. When the speed of the vehicle is lower than the selected speed, for instance, the controlling factor will be positive and will cause a corresponding displacement of the controlling element in the speed-increasing direction to a positive operated position. As a result, the vehicle is caused to pick up speed and continues to do so until the controlling factor has been reduced to zero and the controlling element re-set to neutral. When that happens, however, the governing servomotors will still be positioned in their operated position. Not until the speed of the vehicle has sufficiently increased beyond the selected speed, will the negative controlling factor cause the controlling element to restore the governing servomotors. When that has been accomplished, however, the vehicle will run too slowly thus initiating another controlling cycle. Thus, the actual speed will fluctuate above and beneath the selected speed.

The object of the present invention is an improved system for controlling the speed of a motor vehicle in which such fluctuations are avoided. It is another object of the present invention to provide a controlling system of the character described which is simple and reliable in operation and may be easily adjusted to meet the specific requirements of any particular vehicle.

Further objects of the present invention will appear from a detailed description of a preferred embodiment thereof which is diagrammatically illustrated in the accompanying drawings, it being understood that such detailed description serves the purpose of illustration rather than that of limitation of the invention. In the drawings, Fig. 1 shows a speed-controlling system operable by a pressure fluid, such system including a number of fluid-actuated devices suitably connected by conduits, Fig. 2 is a diagram illustrating the effect of the novel speed-controlling system by indication of the power output of the engine in dependence on the actual speed of the vehicle, and Fig. 3 shows a modification for the system of Fig. 1.

While the present invention is in no way restricted to the use of any particular medium for the generation of the controlling impulses, I prefer to rely for that purpose upon a fluid under pressure, such as oil, fed by a pump, the pump being shown as a gear pump L feeding oil into a conduit 26 under a pressure maintained constant by a spring-controlled relief valve L1.

The motor vehicle is equipped with a continuously variable transmission T adapted to be set by a transmission setting member GO which is connected by a suitable linkage 105 to a reversible servomotor which may take any suitable form, but in the present embodiment is constituted by a piston 106 movable in a stationary cylinder G, one end of which is provided with a port Gs, and the other end with a port G1 for the admission and discharge of a fluid under pressure, the outgoing shaft W of the transmission being geared to the driven wheels of the vehicle, whereas the ingoing shaft E of the transmission is cooperatively connected with the shaft M' of the engine by a hydrodynamic clutch composed of a driving element $n1$ and a driven element $n2$, both elements cooperating to constitute an annular chamber filled with a liquid and subdivided by suitable vanes in a manner well known in the art. Preferably, the size of cylinder G is so correlated to that of pump L that the transmission will not be adjusted in a ratio-reducing sense, i. e. to the right with reference to Fig. 1, at a higher speed than that at which the engine picks up speed, because otherwise the power transfer from the engine to the wheels of the vehicle would be reversed.

The wheels of the vehicle are provided with brakes adapted to be applied by a brake actuator diagrammatically indicated at H. Such brake actuator may comprise a set of actuating cylinders and pistons individually coordinated to the wheels.

The engine is provided with the conventional power-control member, which in the instant case where the engine is of the carburettor type, is constituted by the throttle F provided in the intake pipe of the engine. It will be readily understood, however, that the invention is equally applicable to vehicles equipped with engines of other types, such as diesel engines, where the power-control member is a member other than a throttle.

Broadly speaking, the control system comprises:

(1) An adjustable speed selector, such as a lever A, which is adapted to be optionally set by the driver to a position representative of the desired speed of the vehicle;

(2) A speedometer J geared to the shaft W by suitable means not shown so as to indicate the actual speed of the vehicle. While any speedometer may be used for that purpose, I have shown one of the centrifugal type in which an axially movable rod 100 carries a spring-pressed disk 101 surrounded by a rotary support 102 of two flyweights 103, the shaft 104 of such support being geared to shaft W by a suitable transmission and the customary flexible shaft. The flyweights 103 are carried by bell cranks pivoted to support 102, the shorter inner arms of the bell cranks contacting disk 101. When the speed increases, rod 100 is moved to the right;

(3) An instrument M responsive to the acceleration or the deceleration of the vehicle. Instruments of that kind are well known. For sake of simplicity I have illustrated an acceleration-measuring instrument in form of a pendulum $m1$ pivotal about a horizontal axis 107 extending transversely to the direction of travel and fixed to any suitable part of the vehicle. The pendulum $m1$ is resiliently held in its central position by opposed springs $m2$ and $m3$ encased in an arcuate fixed tube in which pistons 108 and 109 are movable, such pistons being rigidly connected to the pendulum and adapted to act on the springs. The ends of the arcuate tube are connected by a duct $m5$ in which a partition having a restricted throttle orifice $m4$ is provided. The duct $m5$ and the ends of the tube are filled with a viscous liquid whereby oscillations of the pendulum will be absorbed;

(4) A movable controlling element which in the present embodiment is formed by a slide valve designated by B as a whole and composed of a pair of valve members, to wit of a movable bushing $b2$ provided with ports, such as 127, 128, 129, 130, 131, 132, 133, 134, 135, 136 and 137, and of a movable piston member $b1$ slidable in the bushing;

(5) Differential actuating means connecting the selector A, the speedometer J and the acceleration-measuring instrument M to the controlling element in such a manner as to impart to the controlling element B a positive or negative controlling impulse which represents a modified controlling factor, such factor being the difference of the selected speed minus the actual speed indicated by the speedometer minus the acceleration, i. e. the response of the instrument M.

The mode in which the controlling element variably determines the driving force and the braking force applied to the wheels of the vehicle depends on the type of the motor vehicle. Where the motor vehicle, however, is of the type hereinabove described, the movable controlling element acts in the following manner:

NEUTRAL FUNCTION

When the controlling element is in its neutral position as shown, it causes the power-control member, to wit throttle F, to stay in its maximum power position, i. e. fully open. At the same time, the controlling element B causes the servomotor G to stay put, i. e. remain in its position, and disables the brake actuator H.

Now the functions of the controlling element in actuated position will be described:

FIRST FUNCTION

When the controlling element B is actuated from its neutral position in a speed-increasing sense, i. e. valve member $b1$ moving to the left with reference to valve member $b2$, it starts the servomotor G causing the same to set the transmission setting member G0 into motion for progressively increasing the ratio of transmission, i. e. the ratio of the R. P. M. of the ingoing shaft E to the R. P. M. of the outgoing shaft W. As a result, the driving torque exerted by the transmission on shaft W is increased and thus tends to speed up the vehicle. The throttle is maintained in its opened position.

When the controlling element B, however, is actuated from its neutral position as shown in a speed-reducing sense, member $b1$ moving to the right relative to member $b2$, it will successively perform the following functions:

SECOND FUNCTION

It causes the servomotor G to set the transmission setting member G0 into motion for progressively reducing the ratio of transmission, whereby the driving couple exerted on shaft W is reduced. While doing so, the controlling element B causes the power control member F to stay in its maximum power position as shown. As a result, although the engine continues to run with a fully opened throttle, less torque will be delivered to the wheels and the vehicle will slow down.

THIRD FUNCTION

If such reduction of power is insufficient to reduce the modified controlling factor to zero, the controlling element B causes the power-control member F to be moved towards its minimum power position or, in other words, causes the throttle to be closed by suitable actuation of a fluid-actuated servomotor piston 59 movable in a cylinder 61, 62. As a result, the driving force applied to the wheels of the vehicle will be further reduced.

FOURTH FUNCTION

If such reduction of the driving force should still be insufficient to reduce the modified controlling factor to zero, the controlling element B will produce either one of two functions depending on whether or not the throttled engine tends to run so slowly that the transfer of power from the engine to the transmission is reversed. Suitable means are provided which respond to such reversal and which in the present embodiment are constituted by a gear pump N formed by a pair of meshing gears, one gear being mounted on the clutch member $n1$ and the other gear being mounted on the clutch member $n2$. As a result, the direction of feed of the pump N will be reversed when the relative slip of the elements $n1$ and $n2$ is reversed coincidentally to a reversal of power flowing through the clutch. When that happens, the pump causes a reversing element C to be shifted, whereby the connection between the controlling element B and the servomotor G will be reversed. As a result, the servomotor is caused by the controlling element B to set the transmission setting member G0 into motion for progressively increasing the ratio of transmission while keeping the power-control member F in its minimum power position. This has the effect that the coasting vehicle must drive the throttled engine at an increasing speed and must thus overcome an increasing braking power. This condition of operation does not only prevail when the modified control factor is negative; means to be described later are provided whereby this condition of operation may be also maintained when the modified control factor is zero, the control element B being in neutral position. That is required, for instance, when the vehicle is driving downhill requiring a braking effect to maintain the actual speed on the value of the selected speed.

FIFTH FUNCTION

If the braking effect of the engine increased by the transmission should still fail to slow down the vehicle to a point where the modified controlling factor is reduced to zero, the controlling element B will be further actuated away from neutral, the valve member $b1$ moving to the right relative to valve member $b2$, and will supply fluid under pressure to the brake actuator H so that the brakes of the vehicle will be applied with an increasing force. Suitable pressure-control means, such as described in my co-pending prior application Serial No. 192,718 with reference to Figs. 5 and 6 thereof, may be provided between the controlling element and the brake actuator H for the purpose of rendering the pressure prevailing in the brake actuator proportional to the actuation of the control element.

The differential actuating means which connect the selector A, the speedometer J and the acceleration-measuring instrument M to the controlling element B is so designed as to impart to the latter an actuation representing substantially the difference of the selected speed minus the indication of the speedometer minus the response of the instrument M, such actuation being positive, i. e. in a speed-increasing sense, when said difference, i. e. the modified controlling factor, is positive, and in a negative or speed-reducing sense, when the modified controlling factor is negative.

While such differential actuating means may take numerous forms, I prefer to use as such differential actuating means a link 110 connecting the acceleration-measuring instrument M to one of the two valve members, e. g. the bushing $b2$, and a lever 111 connecting the other one of the two valve members, e. g. the piston member $b1$, to both the selector A and the speedometer J. More particularly, the lever 111 is pivoted by a pin $a1$ to the rod 100 of the speedometer and has its upper arm connected by a pin-and-slot conection to the end of piston member $b1$, whereas the lower arm of lever 111 is connected by a pin $a2$ to an axially slidable rod $f2$ which is connected by a rod 112 to the selector lever A. The lengths of the arms of lever 111 are so correlated to the speedometer J and the selector A that the valve member $b1$ is left in the position shown whenever the actual speed is the same as the selected speed.

The lever A may be a pedal mounted in front of the driver's seat.

For the purpose of permitting of a manual adjustment of the selector, a hand lever A1 may be provided having suitable detent means for keeping it in any adjusted position. A slidable support 113 is suitably linked to hand lever A1 and provided with spaced arms 114 and 115 which embrace the lower arm of lever 111, biassed springs 116 and 117 being inserted therebetween. Therefore, the lever 111 will be moved by spring 117 to the position selected by hand lever A1 when the pedal A is relieved by the driver.

When the desired speed set up by the speed selector A is extra low, i. e. lower than that imparted to the vehicle by the engine when the same is operated with a fully opened throttle at the smallest possible R. P. M., it is necessary that the throttle be closed even though the controlling element B may be in its neutral position. To this end, the throttle F is provided with an arm $f1$ adapted to be engaged by the rod $f2$ when the speed selector is set to an extra low speed.

Suitable means are provided to so control servomotor G as to prevent the engine from running too fast or too slow. Such means comprise a slide valve D shiftable by a centrifugal governor K and influenced by a biassed spring 69 which is manually adjustable by a member 73. The valve D is adapted to reverse the servomotor G.

I shall now describe the valve-controlled ports and the ducts connecting the same to each other and to the various elements of the system explaining how the above described functions are produced:

NEUTRAL FUNCTIONS

The fluid under pressure is admitted from pressure conduit 26 to the cylinder space 61 of the throttle-adjusting servomotor via duct 29 of the housing, port 129 of bushing $b2$, spaced between two piston sections 12 and 13 of member $b1$, port 135 of bushing $b2$, duct 35, peripheral groove 55 of piston valve C, duct 58. The other end space 62 of this cylinder is connected to discharge via duct 57, peripheral groove 53 of valve member C, duct 34, port 134 of valve member $b2$, space between piston sections 11 and 12 of valve member $b1$, port 118, and a discharge duct O.

The cylinder spaces G1 and G$s$ of servomotor G are both sealed being connected to the following conduits: G1 to duct 84, peripheral groove 78 of valve member D, duct 81, peripheral groove 50 of valve member C, duct 33, port 133 which is sealed by piston member 11 of control element B, same being in neutral position; G$s$ to duct 85, peripheral groove 79 of valve D, duct 83, peripheral groove 51 of valve C, duct 32 and duct 82, port 132 sealed by piston 10 of the controlling element B, duct 82 being sealed by valve C.

The piston sections 14 and 15 uncover the ports 136 and 137. When valve C is shifted to the coasting position, i. e. to the left with reference to Fig. 1, pressure conduit 26 is connected to the cylinder space 62 via duct 30, port 130, space 24 between piston sections 14 and 15 of valve member $b1$, port 136 of valve member $b2$, duct 36, peripheral groove 53 of valve member C, duct 57. Cylinder space 61 is connected to discharge via duct 58, peripheral groove 55 of coasting valve member C, duct 37, port 137 of valve member $b2$, open end space 25 of the latter. Therefore, the throttle will be immediately closed when the power transfer from the engine to the wheels of the vehicle is reversed.

FIRST FUNCTION

Fluid under pressure is admitted from duct 26 to cylinder space G1 via duct 28, port 128, space between piston sections 10 and 11 of controlling element B, port 133, duct 33, peripheral groove 50 of valve member C, duct 81, peripheral groove 78 of valve member D, duct 84. The communication between ports 129 and 135 of the controlling element B is maintained as before whereby the throttle is kept open.

SECOND FUNCTION

Fluid under pressure is admitted from duct 26 to cylinder space G$s$ of servomotor G via duct 28, port 128, space between piston sections 10 and 11 of controlling element B, port 132 thereof, duct 32, duct 82 which is still sealed, peripheral groove 51 of valve member C, duct 83, peripheral groove 79 of valve member D, duct 85. Cylinder space G1 is connected to discharge via duct 84, peripheral groove 78 of valve member D, duct 81, peripheral groove 50 of valve member C, duct 33, port 133 of controlling element B, space between piston sections 11 and 12 thereof, port 118, discharge duct O. The ports 129 and 135 of controlling element B are still communicating thus keeping throttle F fully opened.

THIRD FUNCTION

Piston section 13 of controlling element B cuts port 135 off from port 129 and the pressure conduit 26 connected thereto and connects port 135 via the space 23 between piston sections 13 and 14 to the discharge port 119. As a result, the cylinder space 61 of the throttle-adjusting servomotor is connected to discharge via duct 58, peripheral groove 55 of valve C, duct 35, port 135, space 23 and port 119. At the same time the pressure conduit 26 is connected to the cylinder space 62 of the throttle-adjusting servomotor via duct 29, port 129 of bushing $b2$, space 22 between piston sections 12 and 13 of valve member $b1$, port 134 of bushing $b2$, duct 34, peripheral groove 53 of valve C, duct 57. Therefore, the piston 59 will move in downward direction with reference to Fig. 1 and will close the throttle, the speed of such closing movement depending on the amount of the modified control factor. As soon as the excessive speed of travel of the vehicle has dropped to the selected speed indicated by the selector A, controlling element B will have returned to neutral and the throttle will be again opened, piston 59 returning to the position shown.

FOURTH FUNCTION

Whereas under normal operating conditions power is transferred from shaft M' to shaft E causing pump N to keep conduit 120 under pressure leading to the end space C1 of the cylindrical cavity encasing valve member C, a reversal of the transfer of power from shaft E to shaft M' incidental to a cutting down of the engine power and to coasting of the vehicle causes pump N to put conduit 121 under pressure leading to end space C2 of valve C. Therefore, valve member C will be shifted to the left with reference to Fig. 1. Pressure conduit 26 will be connected to space G1 in lieu of G$s$ via duct 28, port 128 and space 20 between piston sections 10 and 11 of controlling member B, port 132, duct 32, duct 82, peripheral groove 50 of valve member C, duct 81, peripheral groove 78 of valve member D, duct 84. Space G$s$ will be connected to exhaust via duct 85, peripheral groove 79 of valve member D, duct 83, peripheral groove 51 of valve member C, duct 33, port 133 and space 21 between piston sections 11 and 12 of controlling element B, port 118 thereof, and discharge O.

FIFTH FUNCTION

The pressure conduit 26 will be connected to brake actuator H via duct 27, port 127 of valve member $b2$, space 18 between pistons 8 and 9, port 131 thereof, and duct 31.

As will appear from Fig. 1, the piston sections of valve member $b1$ are equally spaced and the spacing of ports 131, 132, 133, 134, 135, 136 and 137 is so chosen that the aforedescribed second, third, fourth and fifth functions will occur successively as the absolute value of the negative modified control factor increases.

The effect of the modified control factor as distinguished from the control factor effective in the control system described in my co-pending prior application Serial No. 192,718 may be easily explained by reference to a few examples of operation.

First example

The vehicle is running at the selected speed. However, it is running downhill and, therefore, subject to acceleration by a driving component of the gravity. For maintenance of the speed it will be necessary to reduce the driving force even though the vehicle is running at the selected speed. This is effected by the measuring instrument M immediately responding to the acceleration imparted to the vehicle by the gravity, even before the acceleration has taken material effect on the speed. As a result of such acceleration, the modified control factor will no longer be zero, but will be negative resulting in a corresponding negative actuation of controlling element B whereby the driving power is reduced, even before the actual speed has been increased notably. Therefore, the actual speed of the vehicle may be maintained in keeping with the selected speed.

Second example

The vehicle is running too slowly. However, it is running downhill and is picking up speed. Under such conditions no change of the driving power is desired. In other words, the controlling element B should be kept in its neutral position. This object is attained owing to the fact that the difference between the selected speed and the actual speed is balanced by the acceleration of the vehicle.

Third example

The vehicle is running too fast. The difference of the selected speed minus the actual speed is negative. However, the vehicle is running uphill and is, therefore, decelerated. Under such conditions no change of the driving force is required and the controlling element B should stay in neutral position. This object is attained owing to the fact that subtraction of the negative acceleration will balance the difference of the selected and the actual speed resulting in a zero modified control factor.

Fourth example

The vehicle is running at the desired speed. The difference of the selected speed minus the actual speed is zero. However, when the vehicle is entering an upgrade section of the road it needs a more powerful driving force. Hence, the controlling element B should be positively actuated. This is effected by the instrument M which even before the speedometer can detect a loss of actual speed will measure the deceleration to which the vehicle is subjected until the actuation of the controlling member B has been accomplished.

From the foregoing it will be understood that the present invention is a valuable improvement of the speed control system forming the subject matter of the prior application in which the desired speed of the vehicle is set up by the driver, the actual speed being automatically influenced in conformity with the selected speed by a variation of the factors controlling the speed of travel of the vehicle, particularly of a control of the ratio of transmission and of the position of the power-control member of the engine and of the brakes of the vehicle. Viewed from one aspect, the present invention resides in the provision of an additional controlling instrument responsive to an acceleration or deceleration of the vehicle, the controlling effect of such instrument being superimposed on or added to the control factor, whereby the neutral or balanced condition of the system will be reached the later the larger the difference between the actual speed and the selected speed is, or, in other words, the neutral or balanced condition will be reached later when the vehicle is subjected to an acceleration or a deceleration.

More particularly, the control system using pressure fluid means, or pneumatic means, or electrical means for producing and transferring controlling impulses includes a movable controlling element, such as B, which is influenced by the selected speed, the actual speed and the acceleration or deceleration, the position of such controlling element depending, on the one hand, on that of a selector settable to the desired speed and, on the other hand, on the position of a speedometer set in accordance with the actual speed, and on the position of an instrument for measuring the acceleration. Preferably, the movable controlling element is composed of two relatively movable members, one being connected with the speed selector and the speedometer and the other one being connected with the acceleration-measuring instrument. As a result, an acceleration of the vehicle will cause one of the members to move relatively to the other member to thereby result in the desired effect. Preferably, the two members are coaxially disposed.

The invention has the effect of accelerating or decelerating the vehicle at any time in proportion to the difference existing between the actual speed and the selected speed. Small alterations of the actual speed will cause the system to impart a low positive or negative acceleration to the vehicle, whereas large alterations of the actual speed result in a high acceleration or deceleration thereof. Such a control meets the requirements of the driving conditions in a particularly satisfactory manner, as a selected new speed considerably differing from the former shall be attained rather quickly, whereas it is desirable that a small change of the selected speed result in a gradual transition, such transition requiring a comparatively short period of time anyhow. Also, the novel control system results in a smooth transition from the condition of acceleration of the vehicle to the condition of constant speed. Preferably, one of the relatively movable members of the controlling element is connected to a differential lever which, in its turn, is linked to the speed selector adapted to set up the desired speed and is also linked to the speedometer responding to the actual speed.

In contrast to the embodiment shown in the prior application Serial No. 192,718 in which the controlling element is a slide valve which, for the purpose of controlling the actual speed, is on the one hand set by the driver through the intermediary of a spring and on the other hand is set by an auxiliary force contrary to the force of the spring in dependence on the actual speed, the use of a differential lever, according to the present invention, has the advantage that a direct connection of the control slide to a speedometer responding to the actual speed, and to a pressure fluid respectively, is not required. In most cases, particularly where the speedometer is formed by flyweights acting mechanically, such speedometer may be favorably connected to a linkage, such as the differential lever. Also, the springs biassing the control valve may be eliminated.

When lever 111 is adjusted manually or by the pedal A from its medium speed position shown to a higher desired speed, it will rock about pivot $a1$ in anti-clockwise direction moving valve member $b1$ to the left. As a result, fluid under pressure is applied to servomotor G increasing the ratio of transmission thus causing the driving power to be increased. Owing to the consequent acceleration of the vehicle in the direction of travel, the pendulum $m1$ of the instrument M moves to the left contrary to spring $m2$. Hence, the valve $b2$ will follow the valve $b1$ thereby tending to cancel the controlling effect produced, thereby covering port 133 which previously had been uncovered by piston section 11. This has the effect of discontinuing the displacement of the control members varying the condition of travel even before the newly selected speed will have been attained. Hence, the acceleration will be reduced again and the newly selected speed will be smoothly reached by the vehicle.

At the same time the speedometer J responds to the increasing speed shifting lever 111 about the pivot $a2$ to the right, whereby valve $b1$ is likewise moved to the right until a new condition of balance is attained determining the new position of the valve elements $b1$ and $b2$. On account of the reversal of movement thus effected, the controlling members, such as piston 106, will be reversed even before the selected speed will have been attained. Consequently, the controlling members will be restored by the time the actual speed has reached the selected speed.

Since the cancellation of the controlling effect by valve member $b2$ will occur the later, i. e. on attainment of a larger acceleration, the larger the displacement of lever 111 is, also the resulting acceleration will be the larger the larger the difference is between the actual speed prevailing at any time and the newly selected speed.

In Fig. 2 this control is diagrammatically illustrated, the graph $q$ representing the travel resistance encountered by the vehicle on a level road. If $v1$ is the actual speed prevailing at the time and if the selector is shifted to select the new speed $v2$, the power output Q is suddenly increased from Q1 to Q1' and will then gradually change to the new value Q2. If the selector is shifted to $v3$ in lieu of $v2$, a substantially larger increase of the power output up to the point Q1" occurs before a gradual transition to point Q3 takes place. The increase of the power output in this operation will be substantially proportional to the change of the speed $v3:v2$.

A corresponding controlling effect occurs, if the speed selector is shifted from a higher speed to a lower desired speed. In this event, the valve member $b2$ is displaced to the right and thereby causes the transmission to be set to a higher ratio of transmission. Moreover, the throttle F will be closed and possibly the brakes H may be applied. Owing to the resulting deceleration of the vehicle, the pendulum $m1$ will be pressed against the forward spring $m3$ shifting valve member $b2$ to the right to follow valve member $b1$. At the same time, the speedometer J will move to a smaller speed position shifting the valve member $b1$ to the left until a new position of balance corresponding to the newly selected speed will be attained.

While I have described a preferred embodiment of my invention, I wish it to be clearly understood that the invention is in no way limited to the details described, but is capable of numerous modifications within the scope of the appended claims. Thus, for instance a pair of pedals, such as pedals 110, 111 shown in Fig. 3 may be substituted for the pedal A, one pedal being adapted to move pin $a2$ to a higher speed position and the other one being adapted to move pin $a2$ to a lower speed position. Moreover, means may be provided to prevent an actuation of the brakes unless the pedal setting the selector pin $a2$ to a lower speed is actuated. Furthermore, when the invention is applied to a vehicle equipped with a diesel engine, it is preferable to normally keep the power-control member in the position in which the specific fuel consumption is a minimum. This position need not be the full power position.

What I claim is:

1. A system for controlling the speed of a motor vehicle comprising an adjustable speed selector adapted to be optionally set to a position representative of the desired speed of the vehicle, a speedometer, an instrument responsive to the acceleration or the deceleration of the vehicle, a movable controlling element adapted to variably determine the driving force and the braking force applied to the wheels of the vehicle, said controlling element comprising two series-arranged and mutually adjustable control members, and differential actuating means connecting said selector and said speedometer to one of said control members, and further means connecting said instrument to the other of said control members, both means being adapted to impart to said controlling element a controlling impulse representing substantially the difference of the selected speed minus the indication of the speedometer minus the response of said instrument.

2. A system for controlling the speed of a motor vehicle equipped with a continuously variable transmission adapted to be set by a transmission setting member, with an engine, with a power-control member coordinated to such engine and movable between a maximum power position and a minimum power position, with brakes adapted to be applied by a brake actuator, and with a reversible servomotor connected to the transmission setting member, said system comprising an adjustable speed selector adapted to be optionally set to a position representative of the desired speed of the vehicle, a speedometer, an instrument responsive to the acceleration or the deceleration of the vehicle, a movable controlling element movable from an intermediate neutral position in either direction and adapted in said neutral position to cause said power-control member to stay in its maximum power position, at the same time causing said servomotor to remain at rest and disabling said brake actuator, said controlling element being adapted, when moved from its neutral position in a speed-increasing direction, to cause said servomotor to set the transmission setting member into motion for progressively increasing the ratio of transmission thereof, said controlling element being further adapted, when moved from its neutral position in a speed-reducing direction, to perform the successive functions of, first, causing said servomotor to set said transmission setting member into motion for progressively reducing the ratio of transmission thereof, while causing said power-control member to stay in its maximum power position, of, secondly, causing the power-control member to move towards its minimum power position, and, thirdly, of starting the brake actuator; said controlling element comprising two series-arranged mutually adjustable control members and differential actuating means connecting said selector and said speedometer to one of said control members, and further means connecting said instrument to the other of said control members, both means being adapted to impart to said controlling element a movement representing substantially the difference of the selected speed minus the indication of the speedometer minus the response of said instrument, said movement being in said speed-increasing direction, when said difference is positive, and in said speed-reducing direction, when said difference is negative.

3. System as claimed in claim 2 combined with means responsive to a reversal of the transfer of power from the engine to the transmission and with a reversing element controlled by said means and adapted to reverse the connection between said controlling element and said servomotor, whereby movement of said controlling element from its neutral position in speed-reducing direction causes said servomotor to set said transmission setting member into motion for progressively reducing the ratio of transmission thereof, while keeping the power-control member in its minimum power position.

4. The combination as claimed in claim 1 in which said movable controlling element is a slide valve composed of a pair of valve members, to wit of a movable bushing provided with ports and of a movable piston member slidable in said bushing and adapted to control said ports, one of said valve members being connected to said instrument, a differential linkage being provided connecting the other one of said valve members to said speedometer and to said speed selector.

5. The combination as claimed in claim 2 in which said movable controlling element is a slide valve composed of a pair of valve members, to wit of a movable bushing provided with ports and of a movable piston member slidable in said bushing and adapted to control said ports, one of said valve members being connected to said instrument, a differential linkage being provided connecting the other one of said valve members to said speedometer and to said speed selector.

References Cited in the file of this patent

UNITED STATES PATENTS

| | | |
|---|---|---|
| 2,599,214 | Wemp | June 3, 1952 |
| 2,604,197 | Livermore | July 22, 1952 |
| 2,606,456 | Dodge | Aug. 12, 1952 |
| 2,623,617 | Snyder et al. | Dec. 30, 1952 |
| 2,627,328 | Stevens | Feb. 3, 1953 |
| 2,638,793 | Winther et al. | May 19, 1953 |
| 2,648,992 | Vincent | Aug. 18, 1953 |